US012663979B2

(12) United States Patent
Madala et al.

(10) Patent No.: US 12,663,979 B2
(45) Date of Patent: Jun. 23, 2026

(54) SYSTEMS AND METHODS FOR MOUNT POINT CONTEXT DETECTION DURING A FIRMWARE UPDATE PROCESS

(71) Applicant: Dell Products, L.P., Round Rock, TX (US)

(72) Inventors: Raveendra Babu Madala, Bangalore (IN); Santosh Gore, Bangalore (IN); Manasa H, Palamaner (IN); Vineet Maheshwari, Howrah (IN)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 18/478,214

(22) Filed: Sep. 29, 2023

(65) Prior Publication Data

US 2025/0110722 A1 Apr. 3, 2025

(51) Int. Cl.
*G06F 8/65* (2018.01)

(52) U.S. Cl.
CPC ..................................... *G06F 8/65* (2013.01)

(58) Field of Classification Search
CPC .................................................. G06F 8/60–75
See application file for complete search history.

(56) References Cited

U.S. PATENT DOCUMENTS

| | | | | |
|---|---|---|---|---|
| 11,733,995 B2 * | 8/2023 | Kauppinen | ............. | G06F 8/433 |
| | | | | 717/168 |
| 2007/0234332 A1 * | 10/2007 | Brundridge | ............... | G06F 8/65 |
| | | | | 717/168 |
| 2014/0282483 A1 * | 9/2014 | Zhang | ................. | G06F 9/44505 |
| | | | | 717/173 |
| 2018/0173516 A1 * | 6/2018 | Tung | ........................ | G06F 8/654 |
| 2021/0241355 A1 * | 8/2021 | Low | ...................... | H04L 63/062 |
| 2023/0073623 A1 * | 3/2023 | Li | ............................ | G06F 8/433 |

* cited by examiner

*Primary Examiner* — Duy Khuong T Nguyen
(74) *Attorney, Agent, or Firm* — Fogarty LLP

(57) ABSTRACT

Embodiments of the present disclosure provide a system and method to detect a mount context of a firmware update image, and dynamically change an update sequence of the update process so that some, most, or all components may be successfully updated. According to one embodiment, an Information Handling System (IHS) includes multiple updateable components, and executable instructions to cause the IHS to determine that a bundled update image is mounted by a Remote Access Controller (RAC) in which the bundled update image includes multiple component update images associated with the updateable components. In response to the determination, the IHS further re-arranges an original sequence of when each of the component update images are to be applied to their respective updateable components, and applies the component update images according to the re-arranged sequence so that the updateable components are updated successfully.

17 Claims, 7 Drawing Sheets

300

500

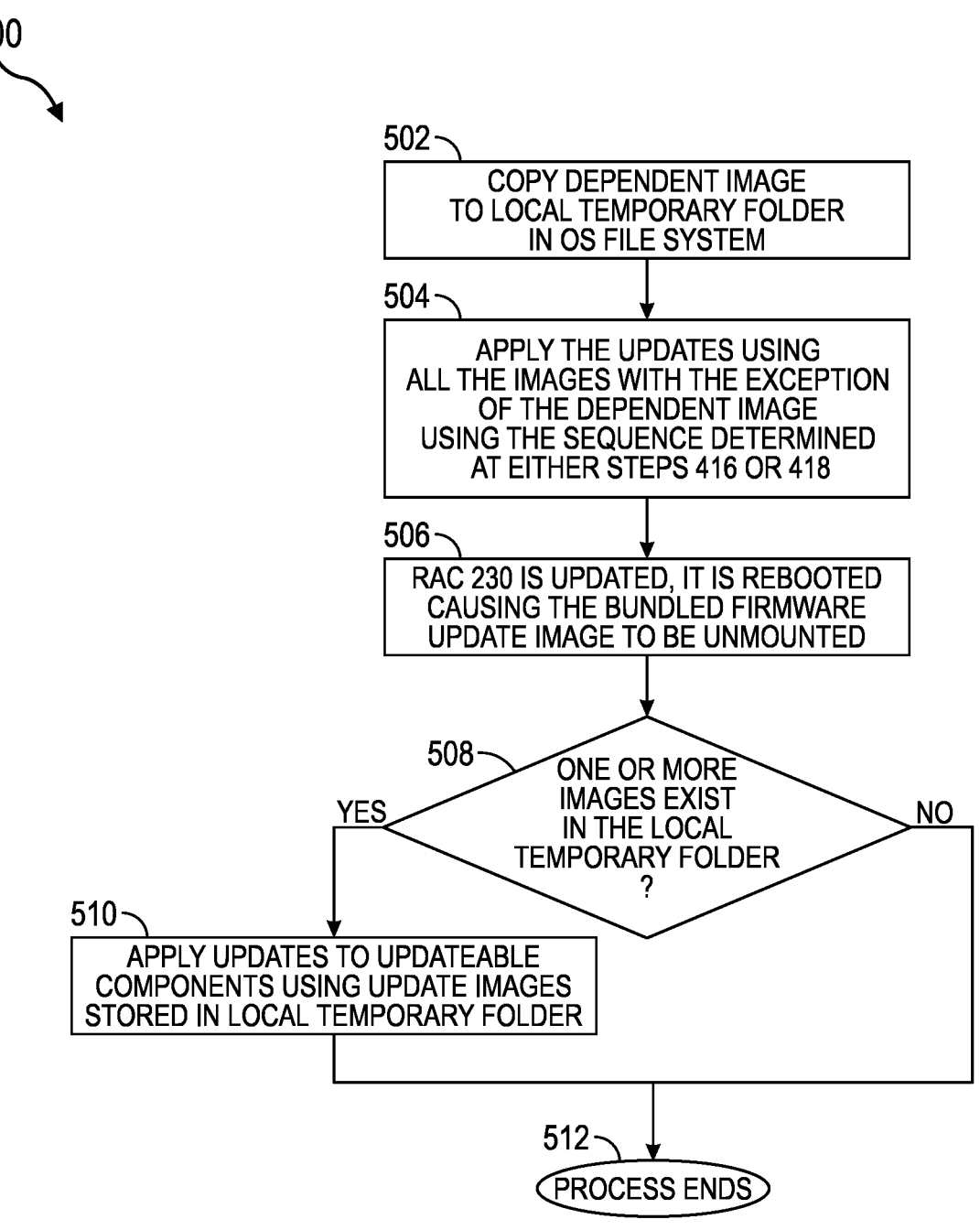

502

COPY DEPENDENT IMAGE
TO LOCAL TEMPORARY FOLDER
IN OS FILE SYSTEM

504

APPLY THE UPDATES USING
ALL THE IMAGES WITH THE EXCEPTION
OF THE DEPENDENT IMAGE
USING THE SEQUENCE DETERMINED
AT EITHER STEPS 416 OR 418

506

RAC 230 IS UPDATED, IT IS REBOOTED
CAUSING THE BUNDLED FIRMWARE
UPDATE IMAGE TO BE UNMOUNTED

508

ONE OR MORE
IMAGES EXIST
IN THE LOCAL
TEMPORARY FOLDER
?

YES        NO

510

APPLY UPDATES TO UPDATEABLE
COMPONENTS USING UPDATE IMAGES
STORED IN LOCAL TEMPORARY FOLDER

512

PROCESS ENDS

FIG. 5

SYSTEMS AND METHODS FOR MOUNT POINT CONTEXT DETECTION DURING A FIRMWARE UPDATE PROCESS

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

Nowadays, software updates are typically made available on one or more download sites as soon as the software provider can produce them. In this manner, software providers can be more responsive to critical flaws, security concerns, and general customer needs. As a result, to update software, a customer would query an update site for software updates, and download and install the software update if available. For example, a typical network-based software update procedure may include the steps of issuing a request over a network to a software provider's download site (e.g., update source) for a software update applicable to the client computer. The update source responds to the client computer with the software update requested by the client computer in the update request. After the client computer has received the software update, the client computer installs the received software update.

One benefit of updating software in such a manner is the reduced cost associated with producing and distributing software updates. Additionally, software updates can now be performed more frequently, especially those that address critical issues and security. Furthermore, a computer user has greater control as to when and which software updates should be installed on the client computer.

SUMMARY

Embodiments of the present disclosure provide a system and method to detect a mount context of a firmware update image, and dynamically change an update sequence of the update process so that some, most, or all components may be successfully updated. According to one embodiment, an Information Handling System (IHS) includes multiple updateable components, and executable instructions to cause the IHS to determine that a bundled update image is mounted by a Remote Access Controller (RAC) in which the bundled update image includes multiple component update images associated with the updateable components. In response to the determination, the IHS further re-arranges an original sequence of when each of the component update images are to be applied to their respective updateable components, and applies the component update images according to the re-arranged sequence so that the updateable components are updated successfully.

According to another embodiment, a dynamic updating method includes the steps of determining that a bundled update image is mounted by a Remote Access Controller (RAC) on a file system of an Information Handling System (IHS), in response to the determination, re-arranging an original sequence of when each of the component update images are to be applied to their respective updateable components, and applying the component update images according to the re-arranged sequence so that the updateable components are updated successfully, The bundled update image including multiple component update images associated with a plurality of updateable components.

According to yet another embodiment, a memory storage device with program instructions stored thereon that, upon execution by one or more processors of a client IHS, cause the client IHS to determine that a bundled update image is mounted by a Remote Access Controller (RAC) on a file system of the IHS, in response to the determination, re-arrange an original sequence of when each of the component update images are to be applied to their respective updateable components, and apply the component update images according to the re-arranged sequence so that the updateable components are updated successfully.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 5 illustrates a dependent image update method depicting how the IHS may handle certain updateable component firmware update images that are dependent upon a Remote Access Controller (RAC) being updated with new firmware according to one embodiment of the present disclosure.

DETAILED DESCRIPTION

Figure 1A:
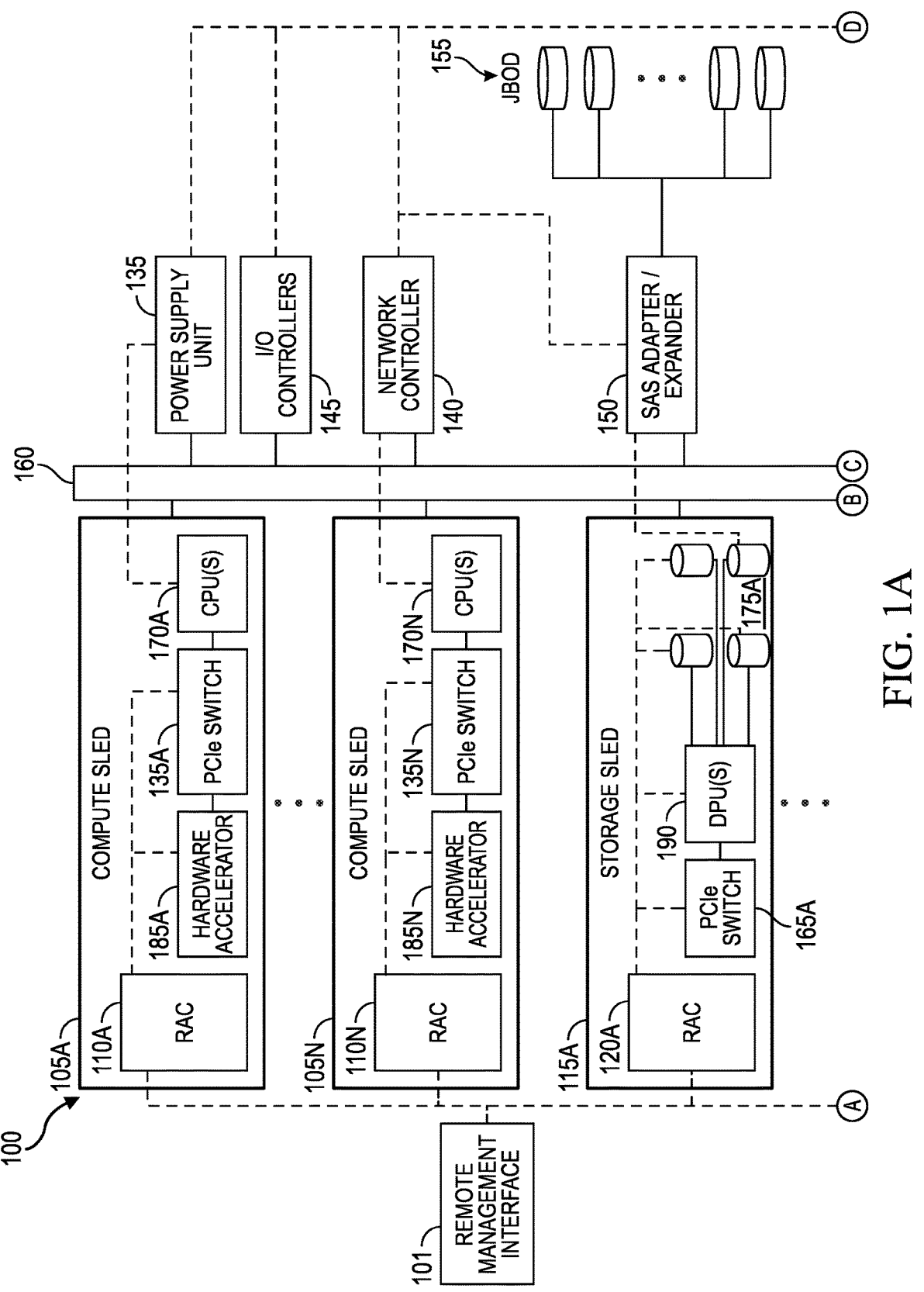
FIGS. 1A and 1B illustrate a block diagram showing certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Firmware updates of server components is an important aspect of the life cycle management of a server. For example, users often upgrade the firmware in the IHSs of a data center for assorted reasons, such as to meet compliance policies, to take advantage of new features, enhancements to the IHS, deploy security fixes, and the like. Traditional means of updating server components have involved migrating the workloads running on the host Operating System (OS), creating a reboot job, rebooting the server, and performing the firmware update. Modern servers typically include numerous updateable components. Updates for these components can be performed using inband and/or outband interfaces. Updateable packages, which can include firmware updates to multiple components in the server, can be bundled as a single file such as Bootable ISO (Optical Disk) image (e.g., Dell Server Update Utility (SUU) ISO format).

In many cases, the firmware update process may be performed by a Remote Access Controller (RAC), which may also be referred to as a Baseboard management Controller (BMC). The RAC may be configured to provide out-of-band management facilities for the IHS 100, even if IHS is powered off, or powered down to a standby state. The RAC may include a processor, memory, and an out-of-band network interface separate from and physically isolated from an in-band network interface of the IHS, and/or other embedded resources. In certain embodiments, the RAC may include or may be part of a Remote Access Controller (e.g., a DELL Remote Access Controller (DRAC) or an Integrated DRAC (iDRAC)).

When the file is mounted directly on the Host OS, a specific defined order is usually specified for when each component is to be updated. When, however, the file is mounted via a RAC, the update sequence may need to change dynamically based on the mount context. That is, If the order is not determined correctly, a failure in the update process may lead to failure because if the RAC is updated first, then the mounted image will be removed from the Host OS when it is rebooted to complete the RAC's update procedure. Heretofore a problem has existed where there has been no mechanism to automatically detect the context of the mounted file in a Host OS so that the sequence of component updates may be changed so that firmware updates to some, most, or all components in the server can be properly updated. As will be described in detail herein below, embodiments of the present disclosure provide a system and method to detect a mount context of a firmware update image, and dynamically change an update sequence of the update process so that some, most, or all components may be successfully updated.

Figure 1B:
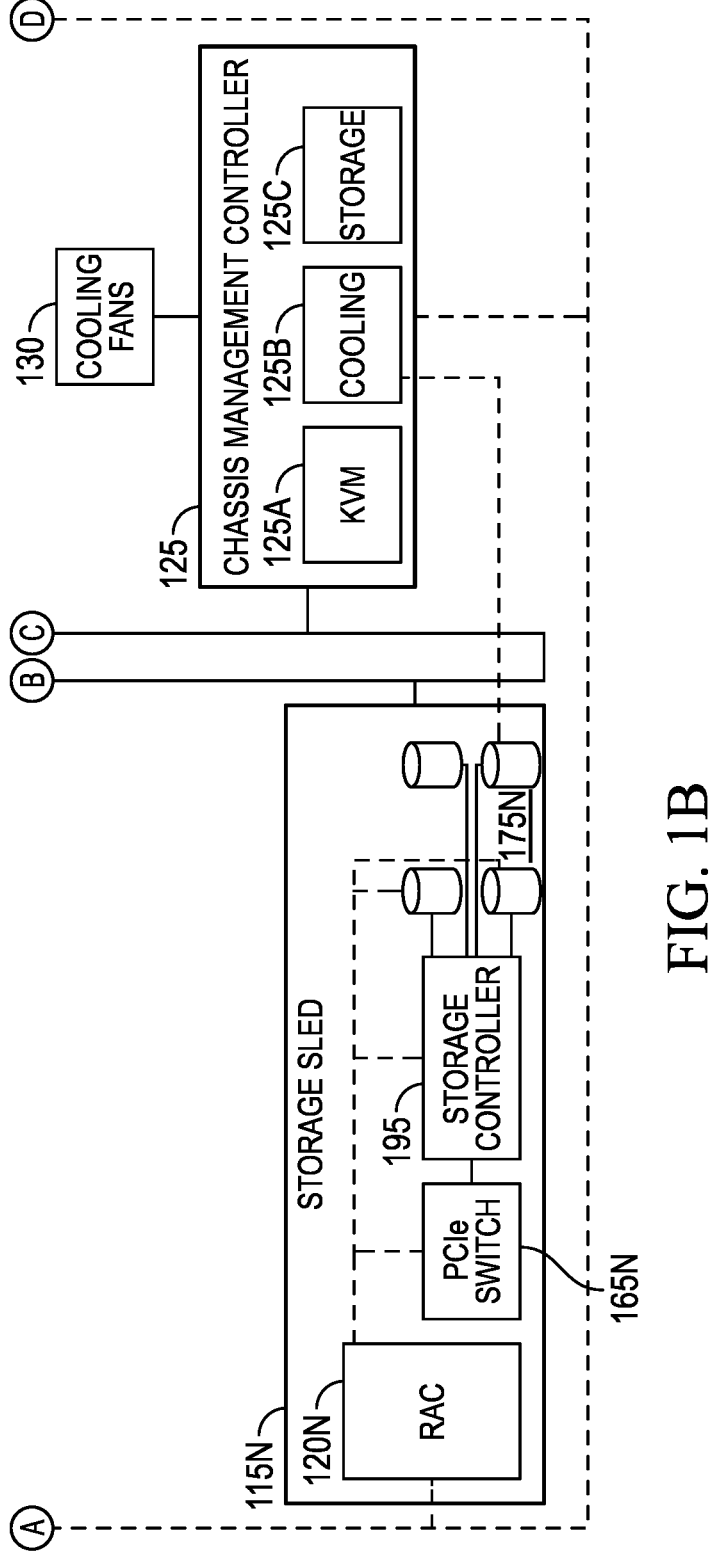

FIG. 1 is a block diagram illustrating certain components of a chassis 100 comprising one or more compute sleds 105*a-n* and one or more storage sleds 115*a-n* that may be configured to implement the systems and methods described according to one embodiment of the present disclosure. Embodiments of chassis 100 may include a wide variety of hardware configurations in which one or more sleds 105*a-n*, 115*a-n* are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105*a-n*, 115*a-n* that are installed in the chassis. In addition, once the chassis 100 has been deployed, firmware used by individual hardware components of the sleds 105*a-n*, 115*a-n*, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105*a-n* and storage sleds 115*a-n*. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power, and network bandwidth, to be shared by the compute sleds 105*a-n* and storage sleds 115*a-n*, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135*a-n*, 165*a-n* installed in the sleds 105*a-n*, 115*a-n* of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185*a-n* that may include one or more programmable processors that operate separate from the main CPUs 170*a-n* of computing sleds 105*a-n*. In various embodiments, such hardware accelerators 185*a-n* may include DPUs (Data Processing Units), GPUs (Graphics Processing Units), SmartNICs (Smart Network Interface Card) and/or FPGAs (Field Programmable Gate Arrays). These hardware accelerators 185*a-n* operate according to firmware instructions that may be occasionally updated, such as to adapt the capabilities of the respective hardware accelerators 185*a-n* to specific computing tasks.

Chassis 100 may be installed within a rack structure that provides at least a portion of the cooling utilized by the sleds 105*a-n*, 115*a-n* installed in chassis 100. In supporting air-flow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105*a-n*, 115*a-n* installed within the chassis. In this manner, a rack and a chassis 100 installed within the rack may utilize various configurations and combinations of cooling fans 130 to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electri-cally couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connec-tors for use in coupling sleds 105*a-n*, 115*a-n* to backplane 160 include PCIe couplings that support high-speed data links with the sleds 105*a-n*, 115*a-n*. In various embodi-ments, backplane 160 may support diverse types of connec-tions, such as cables, wires, midplanes, connectors, expan-sion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 136.

Figure 2:
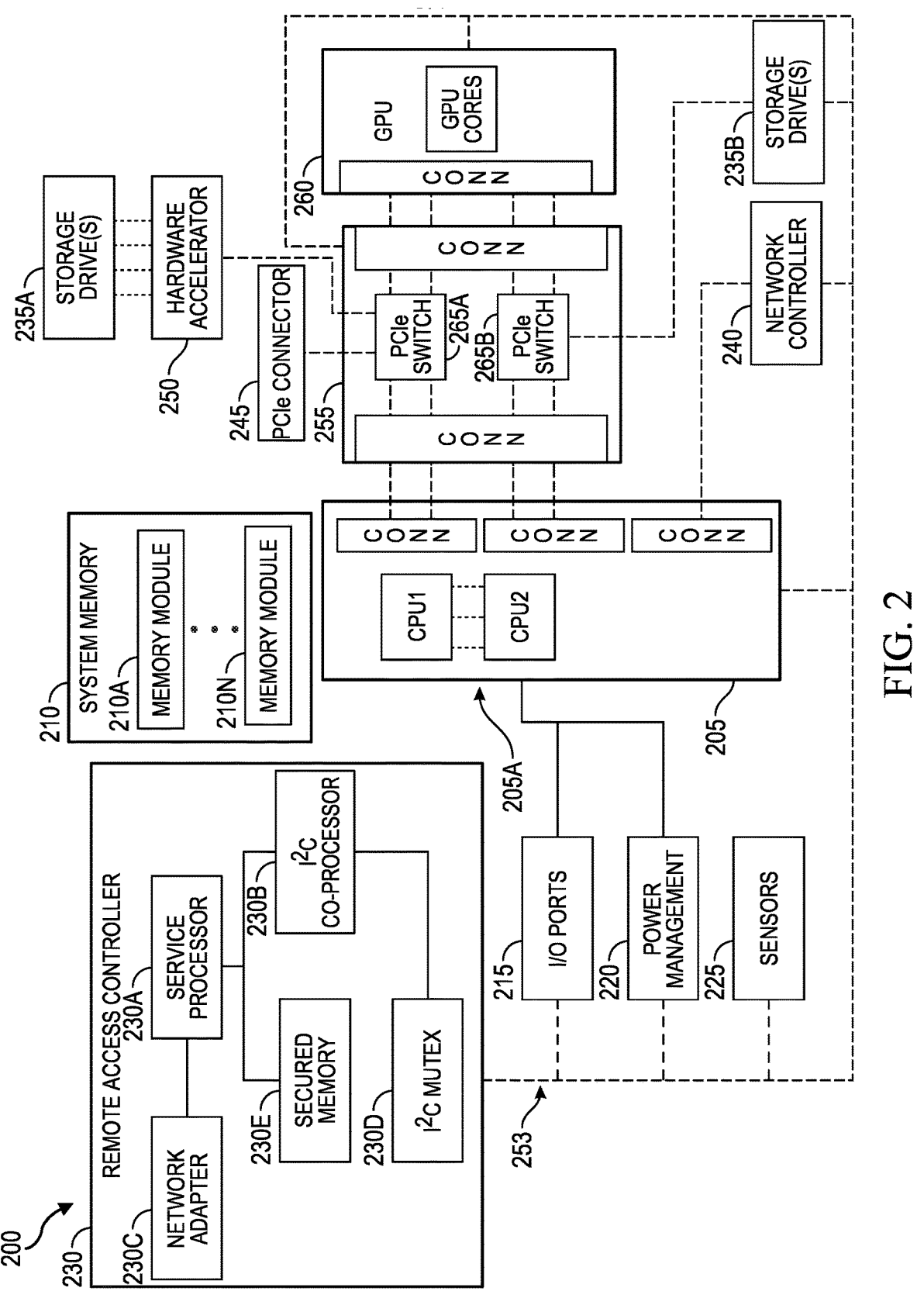
FIG. 2 illustrates an example of an IHS configured to implement systems and methods described herein according to one embodiment of the present disclosure.

In certain embodiments, each individual sled 105*a-n*, 115*a-n-n* may be an IHS such as described with regard to IHS 200 of FIG. 2. Sleds 105*a-n*, 115*a-n* may individually or collectively provide computational processing resources that may be used to support a variety of e-commerce, multimedia, business, and scientific computing applications, such as artificial intelligence systems provided via cloud computing implementations. Sleds 105*a-n*, 115*a-n* are typi-cally configured with hardware and software that provide leading-edge computational capabilities. Accordingly, ser-vices that are provided using such computing capabilities are typically provided as high-availability systems that operate with minimum downtime.

In high-availability computing systems, such as may be implemented using embodiments of chassis 100, any down-time that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105*a-n*, 115*a-n* be likewise made without having to reboot the respective sled of the hardware component that is being updated.

As illustrated, each sled 105*a-n*, 115*a-n* includes a respec-tive remote access controller (RAC) 110*a-n*, 120*a-n*. As described in additional detail with regard to FIG. 2, remote access controller 110*a-n*, 120*a-n* provides capabilities for remote monitoring and management of a respective sled 105*a-n*, 115*a-n* and/or of chassis 100. In support of these monitoring and management functions, remote access con-trollers 110*a-n* may utilize both in-band and sideband (i.e., out-of-band) communications with various managed com-ponents of a respective sled 105*a-n* and chassis 100. Remote access controllers 110*a-n*, 120*a-n* may collect diverse types of sensor data, such as collecting temperature sensor read-ings that are used in support of airflow cooling of the chassis 100 and the sleds 105*a-n*, 115*a-n*. In addition, each remote access controller 110*a-n*, 120*a-n* may implement various monitoring and administrative functions related to a respec-tive sled 105*a-n*, 115*a-n*, where these functions may be implemented using sideband bus connections with various internal components of the chassis 100 and of the respective sleds 105*a-n*, 115*a-n*. As described in additional detail below, in various embodiments, these capabilities of the remote access controllers 110*a-n*, 120*a-n* may be utilized in updating the firmware of hardware components of chassis 100 and/or of hardware components of the sleds 105*a-n*, 115*a-n*, without having to reboot the chassis or any of the sleds 105*a-n*, 115*a-n*.

The remote access controllers 110*a-n*, 120*a-n* that are present in chassis 100 may support secure connections with a remote management interface 101. In some embodiments, remote management interface 101 provides a remote admin-istrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175*a-n* installed in a chassis 100, or to all of the storage drives 175*a-n* of a particular model or manufacturer. In some instances, remote management interface 101 may include an inventory of the hardware, software, and firmware of chassis 100 that is being remotely managed through the operation of the remote access controllers 110*a-n*, 120*a-n*. The remote management interface 101 may also include various monitoring interfaces for evaluating telemetry data collected by the remote access controllers 110*a-n*, 120*a-n*. In some embodiments, remote management interface 101 may communicate with remote access controllers 110*a-n*, 120*a-n* via a protocol such the Redfish remote management interface.

In the illustrated embodiment, chassis 100 includes one or more compute sleds 105*a-n* that are coupled to the back-plane 160 and installed within one or more bays or slots of chassis 100. Each of the individual compute sleds 105*a-n* may be an IHS, such as described with regard to FIG. 2. Each of the individual compute sleds 105*a-n* may include various different numbers and types of processors that may be adapted to performing specific computing tasks. In the illustrated embodiment, each of the compute sleds 105*a-n* includes a PCIe switch 135*a-n* that provides access to a hardware accelerator 185*a-n*, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage drives 155 may be accessed via a SAS expander 150 that is coupled to the backplane 160 of the chassis 100. The SAS expander 150 may support connections to a number of JBOD (Just a Bunch of Disks) storage drives 155 that, in some instances, may be configured and managed individually and without implementing data redundancy across the various storage drives 155. The additional storage drives 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 require the updates to be applied within each of these topologies being supported by the chassis 100. Despite the substantial number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 136 that provides the components of the chassis with various levels of DC power from an AC power source or from power delivered via a power system provided by a rack within which chassis 100 may be installed. In certain embodiments, power supply unit 136 may be implemented within a sled that may provide chassis 100 with redundant, hot-swappable power supply units. Power supply unit 136 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105*a-n*, 115*a-n*, or other type of server, such as an 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205*a*. The system memory 210 is coupled to CPUs 205 via one or more memory buses that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205. PCIe switches 265*a-b* may multiply the number of PCIe lanes available to CPUs 205, thus allowing more PCIe devices to be connected to CPUs 205, and for the available PCIe bandwidth to be allocated with greater granularity. Each of the PCIe switches 265*a-b* may operate according to firmware instructions that may be occasionally updated.

Using the available PCIe lanes, the PCIe switches 265*a-b* may be used to implement a PCIe switch fabric. Also through this switch fabric, PCIe NVMe (Non-Volatile Memory Express) transmission may be supported and utilized in high-speed communications with SSDs, such as storage drives 235*a-b*, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235*a-b* in various topologies, in the same manner as described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the storage drives 235*a-b* of IHS 200 may include a combination of both SSD and magnetic disk storage drives. In other embodiments, all of the storage drives 235*a-b* of IHS 200 may be identical, or nearly identical. In all embodiments, storage drives 235*a-b* operate according to firmware instructions that may be occasionally updated.

As illustrated, PCIe switch 265*a* is coupled via a PCIe link to a hardware accelerator 250, such as a DPU, Smart-NIC, GPU and/or FPGA, that may be a connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235*a*, such as SSDs. In such storage drive topologies, hardware accelerator 250 may implement processing of PCIe NVMe communications with storage drives 235*a*, thus supporting high-bandwidth connections with the storage drives. Hardware accelerator 250 may also include one or more memory devices used to store program instructions executed by the processing cores and/ or used to support the operation of storage drives 235*a* such as in implementing cache memories and buffers utilized in support of high-speed operation of these storage drives, and in some cases may be used to provide high-availability and high-throughput implementations of the read, write and other I/O operations that are supported by these storage drives 235*a*. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each GPU card may include one or more GPUs 260. In some embodiments, PCIe switches 265*a-b* may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or indirectly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement an I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 253 is illustrated as single line in FIG. 2. However, sideband bus 253 may be comprised of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
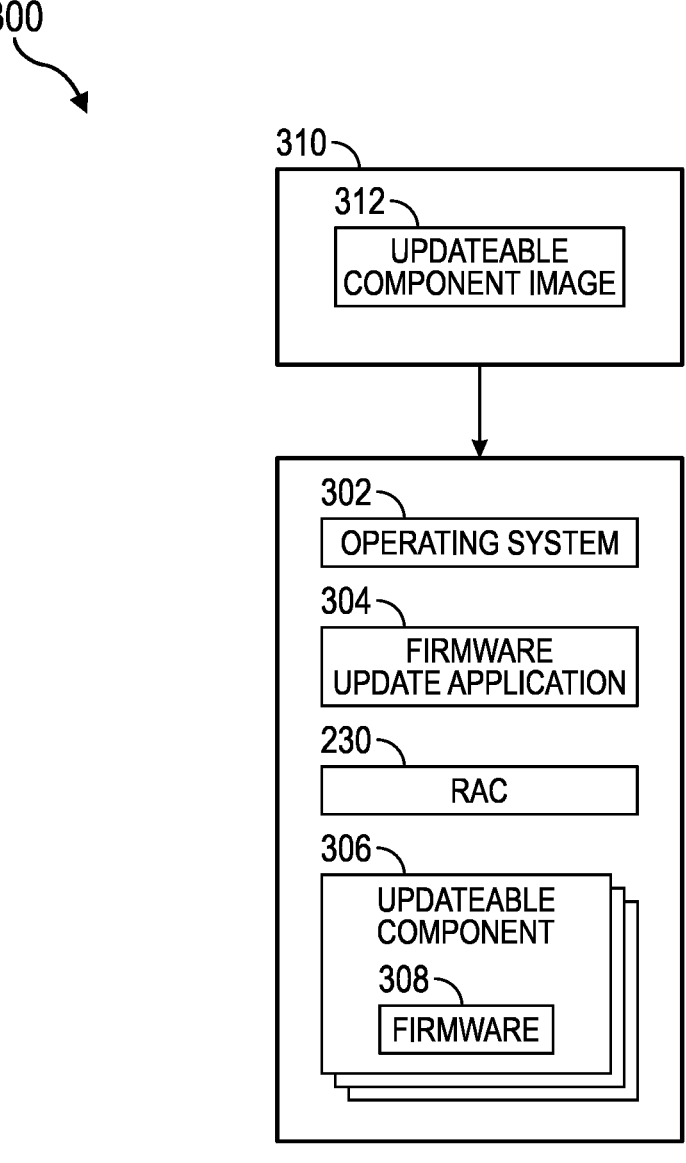
FIG. 3 is a diagram illustrating several components of an IHS that may communicate with one another for implementing a dynamic updating system based on a detected mount context of an update file according to one embodiment of the present disclosure.

FIG. 3 is a diagram illustrating several components of an IHS 200 showing how those components may communicate with one another for implementing a dynamic updating system 300 based on a detected mount context of an update file according to one embodiment of the present disclosure. The IHS 200 is shown with an operating system (OS) 302 and a firmware update application 304 that are stored in a memory and executed by one or more processors of the IHS 200. The IHS 200 also includes a RAC 230, as described herein above, and one or more updateable components 306, each with its own installed firmware 308.

The updateable components 306 may be any type of IHS configurable device that may be updated with new firmware updates at an ongoing basis. For example, one updateable component 306 may include a non-volatile storage unit (e.g., hard disks, Solid State Drives (SSDs), etc.), a Network Interface Card (NIC), a Graphical Processing Unit (GPU), the RAC 230 itself, a Hardware RAID (HWRAID) device, and the like. Citing a particular example, the updateable component 306 may include those that are configured on a storage sled 115a-n, and/or storage resources 155 configured in a JBOD, such as described herein above with reference to FIGS. 1 and 2.

The firmware update application 304 is configured to obtain a bundled update image 310 from a suitable source, such as an online support website that provides ongoing bundled update image 310 at an ongoing basis as they are needed or desired. The bundled update image 310 includes one or more component update image 312 for corresponding updateable components 306 that are to be updated with new firmware. Examples of such a firmware update application 304 may include a Dell Systems Update (DSU) application or a Dell Server Update Utility (SUU) application provided by DELL TECHNOLOGIES.

The RAC 230 may communicate with the OS 302, firmware update application 304, and updateable components 306 using any suitable type of communications protocol. For example, the RAC 230 may communicate with each of multiple updateable components 306 via an i2c connection such as described above to transfer the component update image 312 and activate it once transferred. In other embodiments, the RAC 230 may communicate with each of the updateable components 306 using other communication protocols, such as i3c SENSEWIRE connections, or serial peripheral interface (SPI) based connections. Additionally, the RAC 230 may also communicate with each of the updateable components 306 through a system bus of the IHS 200 using a Management Component Transport Protocol (MCTP) PCIe vendor defined message (VDM) channel.

In embodiment, the firmware update application 304 and bundled update image 310 may be accessed remotely by a user using the RAC 230. For example, the RAC 230 may be remotely accessed through a communication network, such as a private LAN or a publicly accessible network, such as the Internet to launch the firmware update application 304 and obtain the bundled update image 310. Nevertheless, one particular drawback of downloading the bundled update image 310 and updating the updateable components 306 via the firmware update application 304 is that when the RAC 230 itself is updated with new firmware, it typically requires a system reboot in order for the new firmware to be activated. Because the RAC 230 may have been used to access and mount the bundled update image 310 on a file system of the OS 302, the bundled update image 310 may become unmounted when the RAC 230 is rebooted such that other component update images 312 on the bundled update image 310 may not be able to get properly updated on their respective updateable components 306. As will be described in detail below with reference to FIGS. 4 and 5, the dynamic updating system 300 maintains context information about how the bundled update image 310 is mounted on the file system of the OS 302, and adaptively re-orders the sequence of when certain component update images 312 are updated on their respective updateable components 306 so that the firmware updates to some component update images 312 provided in the bundled update image 310 are not prematurely interrupted or canceled.

Figure 4A:
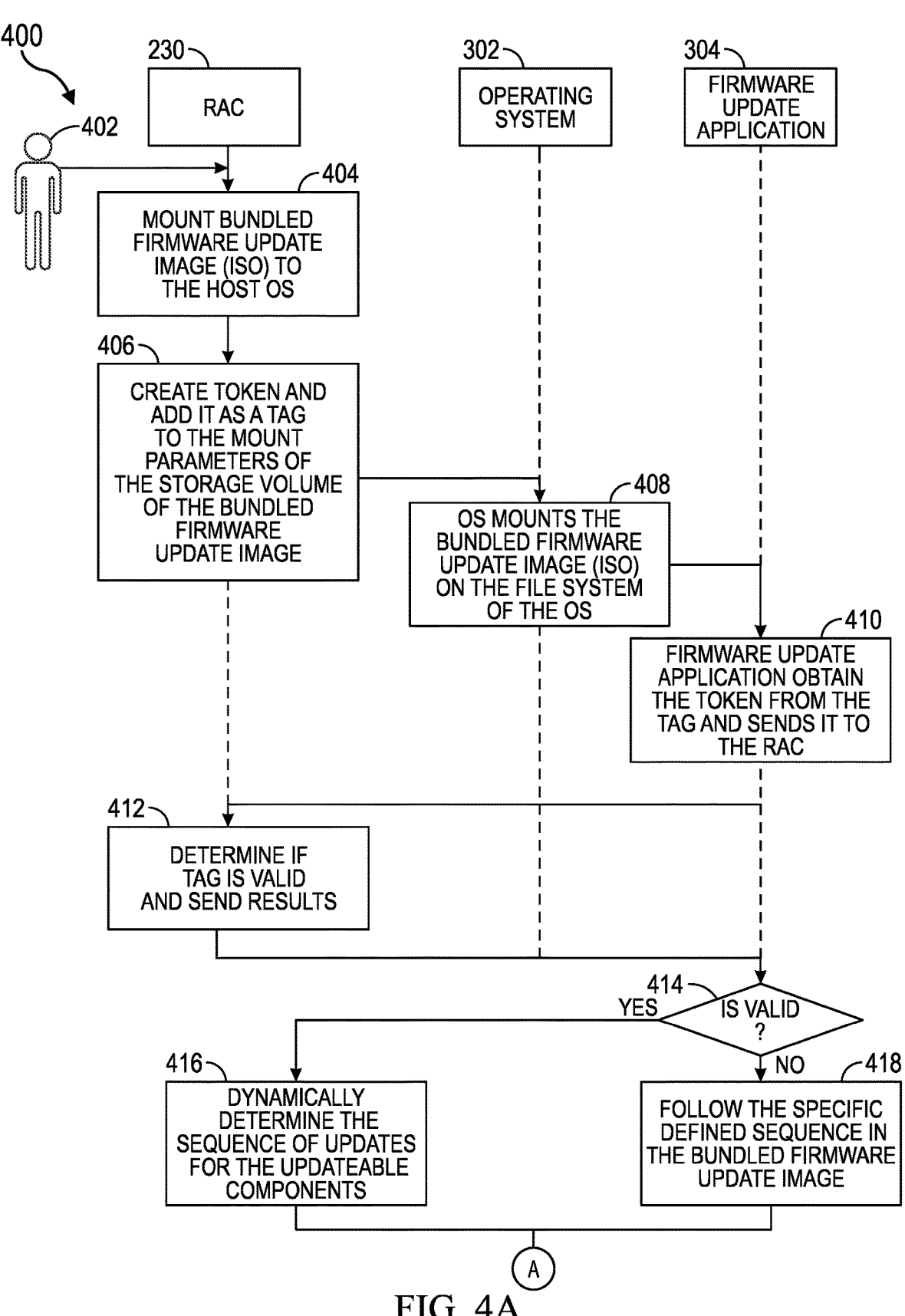
FIGS. 4A and 4B illustrate a dynamic updating method depicting how the IHS may dynamically arrange a sequence of when each component update image of a bundled update image are updated according to its mount context according to one embodiment of the present disclosure.
Figure 4B:
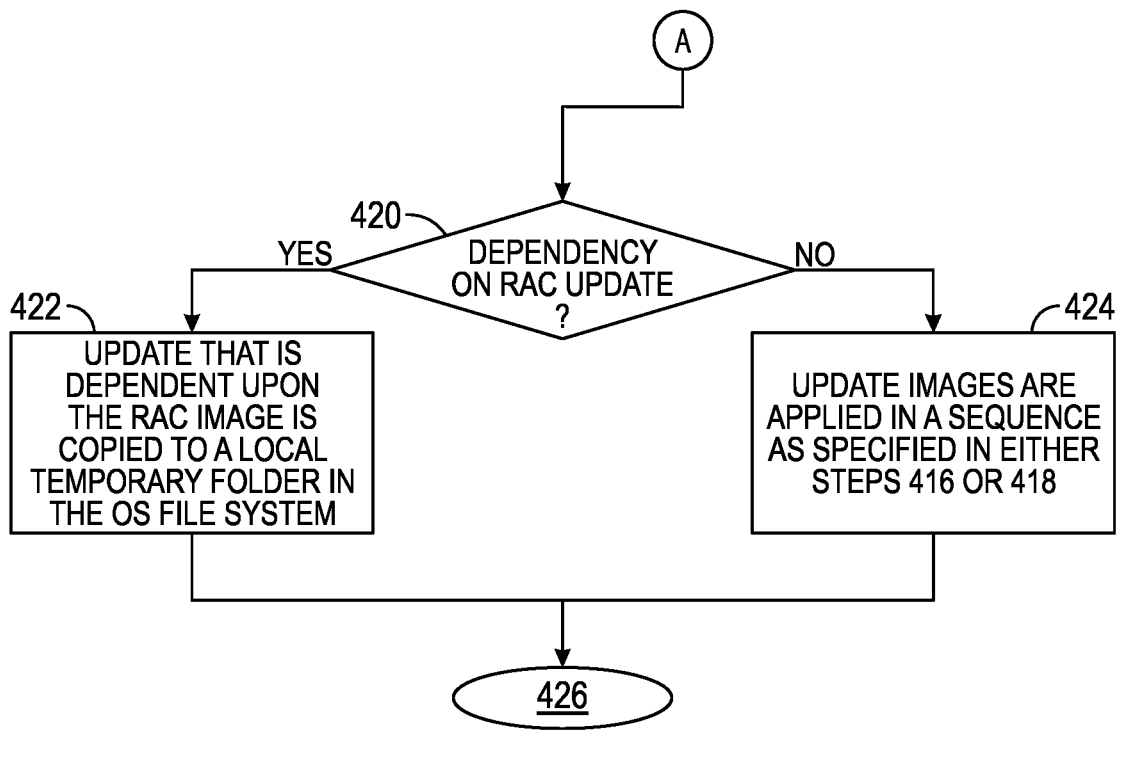

FIG. 4 illustrates a dynamic updating method 400 depicting how an IHS 200 may dynamically arrange a sequence of when each component update image 312 of a bundled update image 310 are updated according to a mount context of the bundled update image 310 according to one embodiment of the present disclosure. In one embodiment, the dynamic updating method 400 may be performed in whole, or in part, by the storage unit inventory generation system 300 described herein above. Additionally, the method 400 may be performed at any suitable time, such as whenever a bundled update image 310 is to be downloaded or otherwise obtained, and it constituent component update image 312 installed on their respective updateable components 306.

Initially at step 404, the RAC 230 may mount a bundled firmware update image 310 (ISO) to the host OS 302. For example, the RAC 230 may be responsive to user input of a user 402 to trigger mounting of the bundled firmware update image remotely via the RAC 230. Thereafter at step 406, the RAC 230 creates a token and adds it as a tag to the mount parameters of the storage volume of the bundled firmware update image. In one embodiment, the tag comprises a JSON Web Token (JWT) token that is configured with a finite expiration time. The JWT token provides relatively good resilience against spoofing, while the finite expiration time ensures that any previous or subsequent bundled firmware update procedures are not conflicted with the present bundled firmware update procedure. In one embodiment, the tag comprises the JWT token being stored in the device properties metadata portion of the mount parameters of the storage volume, which remain persistent even when the bundled firmware update image 310 is unmounted.

At step 408, the OS 302 mounts the bundled firmware update image 310 (ISO) on the file system of the OS 302. The firmware update application 304 obtains the token from the tag and sends it to the RAC 230 at step 410. That is, the firmware update application may obtain the token when it initiates an update procedure using the bundled firmware update image. For example, after mounting the firmware update image on the OS file system using the RAC 230, the user may provide user input to the firmware update application 304 to commence the update procedure in which it accesses the tag (e.g., JWT token) from the device properties of the storage volume and sends it to the RAC 230. At step 412, the RAC 230 determines if the tag is valid and send results to the firmware update application 304. In one embodiment, the RAC 230 may determine if a JWT token is valid using a JWT token validator that provides a relatively high level of reliability whether the JWT token originated from the RAC 230 or not and sends the results of the determination to the firmware update application 304.

At step 414, the firmware update application 304 uses the results of the determination found at step 412 to decide whether to dynamically change the sequence of updates. If the token is valid indicating that the RAC 230 was used to mount the bundled firmware update image 310, processing continues at step 416 in which the firmware update application 304 dynamically determines the sequence of updates for the updateable components 306. For example, if the bundled firmware update image 310 includes ten component update images 312, and one of those, which is specified to be the third one updated, is associated with the RAC 230, the firmware update application 304 may re-arrange the sequence such that the image 312 associated with the RAC 230 is the last one (e.g., tenth one) that is updated. If however, the token is not valid indicating that the RAC 230 was not used to mount the bundled firmware update image 310, processing continues at step 418 in which the specific sequence defined in the bundled firmware update image 310 is followed.

At step 420, the firmware update application 304 determines whether any other images 312 are dependent upon the RAC 230 being successfully updated. If so, processing continues at step 422 in which the image 312 that is dependent upon the RAC image 312, is copied to a local temporary folder in the OS 302 file system. Additional details regarding how and why the dependent image 312 is copied to the local temporary folder will be described in detail herein below with reference to the method of FIG. 5. Nevertheless, if no other images 312 are dependent upon the RAC 230 being successfully updated, processing continues at step 424 in which the update images 312 are applied in a sequence as specified in either steps 416 or 418. Thereafter at step 426, the process ends.

FIG. 5 illustrates a dependent image update method 500 depicting how an IHS 200 may handle certain updateable component firmware update images 312 that are dependent upon the RAC 230 being updated with new firmware according to one embodiment of the present disclosure. Additionally or alternatively, the dependent image update method 500 may be performed in whole, or in part, by the storage unit inventory generation system 300 described herein above and in particular, by the firmware update application 304. Additionally, the method 400 may be performed at least in part, as part of step 422 as described above with reference to FIG. 4.

At step 502, the firmware update application 304 copies any dependent images 312 to a local temporary folder in OS 302 file system when it is found that those images 312 are dependent upon a newly updated RAC image 312. Thereafter at step 504, the firmware update application 304 applies the updates using all the images 312 (which includes the RAC image 312) with the exception of the dependent image 312 using the sequence determined at either steps 416 or 418. When the RAC 230 is updated, it is rebooted, thus causing the bundled firmware update image 310 to be unmounted at step 506.

Thus, after the RAC 230 is rebooted following its update, the firmware update application 304 determines whether one or more one or more images 312 exist in the local temporary folder at step 508. In one embodiment, the firmware update application 304 makes this determination after all of the steps of the method 400 of FIG. 4 have been performed so that the RAC 230 is ensured of being updated with its latest update image 312. If no images 312 exist in the local temporary folder, processing continues at step 512 in which the process ends. However, if any images 312 do exist in the local temporary folder, processing continues at step 510 in which the firmware update application 304 applies updates to their respective updateable components 306 using the images 312 stored in local temporary folder, and continues processing at step 512 in which the processing ends.

Although FIGS. 4 and 5 describes example methods 400 and 500 that may be performed to update the updateable component firmware update images 312 dynamically, the features of the disclosed processes may be embodied in other specific forms without deviating from the spirit and scope of the present disclosure. For example, certain steps of the disclosed methods 400 and 500 may be performed sequentially, or alternatively, they may be performed concurrently. As another example, the methods 400 and 500 may perform additional, fewer, or different operations than those operations as described in the present example. As yet another example, the steps of the processes described herein may be performed by a manual or executable process other than a firmware update application 304 as described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a plurality of updateable components;
at least one processor; and
at least one memory coupled to the at least one processor, the at least one memory having program instructions stored thereon that, upon execution by the at least one processor, cause the IHS to:
determine that a bundled update image is mounted by a Remote Access Controller (RAC) on a file system of the IHS, the bundled update image comprising a plurality of component update images associated with the updateable components and a RAC update image associated with the RAC, the RAC configured to manage the operation of the updateable components;
in response to the determination that the bundled update image is mounted by the RAC, re-arrange an original sequence of when the component update images are to be applied to their respective updateable components by scheduling the RAC to be the last component update image applied; and
apply the component update images according to the re-arranged sequence so that the updateable components and the RAC update image are updated successfully.

2. The IHS of claim 1, wherein the instructions, upon execution, cause the RAC to perform a reboot operation, wherein the reboot operation causes the bundled update image to be unmounted from the file system.

3. The IHS of claim 1, wherein the instructions, upon execution, cause the IHS to, when one of the component update images possesses a dependency to the component update image of the RAC:
store the one component update image in a local temporary storage of the IHS;
apply the component update image to the RAC;
when the RAC has finished re-booting:
access the one component update image from the local temporary storage; and
apply the one component update image to its associated updateable component.

4. The IHS of claim 1, wherein the instructions, upon execution, cause the IHS to: verify that the RAC mounted the bundled component update image using a token generated by the RAC.

5. The IHS of claim 4, wherein the token comprises a JSON Web Token (JWT).

6. The IHS of claim 4, wherein the token comprises an expiration time.

7. The IHS of claim 1, wherein the instructions, upon execution, cause the RAC to mount the bundled component update image using a remote communications session.

8. The IHS of claim 1, wherein the instructions, upon execution, cause the IHS to store the token in a device properties metadata portion of the bundled component update image.

9. A dynamic updating method comprising:

determining that a bundled update image is mounted by a Remote Access Controller (RAC) on a file system of an Information Handling System (IHS), the bundled update image comprising a plurality of component update images associated with a plurality of updateable components and a RAC update image associated with the RAC, the RAC configured to manage the operation of the updateable components;

in response to the determination, re-arranging an original sequence of when the component update images are to be applied to their respective updateable components by scheduling the RAC to be the last component update image applied; and applying the component update images according to the re-arranged sequence so that the updateable components and the RAC update image are updated successfully.

10. The dynamic updating method of claim 9, further comprising performing a reboot operation, wherein the reboot operation causes the bundled update image to be unmounted from the file system.

11. The dynamic updating method of claim 9, further comprising, when one of the component update images possesses a dependency to the component update image of the RAC:

storing the one component update image in a local temporary storage of the IHS;

applying the component update image to the RAC:

when the RAC has finished re-booting, accessing the one component update image from the local temporary storage; and applying the one component update image to its associated updateable component.

12. The dynamic updating method of claim 9, further comprising verifying that the RAC mounted the bundled component update image using a token generated by the RAC.

13. The dynamic updating method of claim 9, further comprising mounting the bundled component update image using a remote communications session.

14. The dynamic updating method of claim 9, further comprising storing the token in a device properties metadata portion of the bundled component update image.

15. A memory storage device having program instructions stored thereon that, upon execution by one or more processors of a client Information Handling System (IHS), cause the client IHS to:

determine that a bundled update image is mounted by a Remote Access Controller (RAC) on a file system of the IHS, the bundled update image comprising a plurality of component update images associated with a plurality of updateable components and a RAC update image associated with the RAC, the RAC configured to manage the operation of the updateable components;

in response to the determination, re-arrange an original sequence of when the component update images are to be applied to their respective updateable components by scheduling the RAC to be the last component update image applied; and apply the component update images according to the re-arranged sequence so that the updateable components and the RAC update image are updated successfully.

16. The memory storage device of claim 15, wherein the instructions, upon execution, cause the IHS to perform a reboot operation, wherein the reboot operation causes the bundled update image to be unmounted from the file system.

17. The memory storage device of claim 15, wherein the instructions, upon execution, cause the IHS to, when one of the component update images possesses a dependency to the component update image of the RAC:

store the one component update image in a local temporary storage of the IHS;

apply the component update image to the RAC;

when the RAC has finished re-booting:

access the one component update image from the local temporary storage; and apply the one component update image to its associated updateable component.

\* \* \* \* \*